(12) United States Patent
Eguchi (10) Patent No.: US 6,177,779 B1
(45) Date of Patent: Jan. 23, 2001

(54) DEVICE AND METHOD FOR PROCESSING INFORMATION, BATTERY PACK, AND TRANSMITTING MEDIUM

(75) Inventor: Yasuhito Eguchi, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/355,568

(22) PCT Filed: Dec. 3, 1998

(86) PCT No.: PCT/JP98/05467

§ 371 Date: Sep. 10, 1999

§ 102(e) Date: Sep. 10, 1999

(87) PCT Pub. No.: WO99/28808

PCT Pub. Date: Jun. 10, 1999

(30) Foreign Application Priority Data

Dec. 3, 1997 (JP) .................................................. 9-332557

(51) Int. Cl.[7] ........................... H01M 10/44; H01M 10/46
(52) U.S. Cl. .......................................................... 320/116
(58) Field of Search .................................. 320/106, 110, 320/116, 118, 125, 137, DIG. 11, DIG. 12

(56) References Cited

FOREIGN PATENT DOCUMENTS

| | | |
|---|---|---|
| 3-207226 | 9/1991 | (JP) . |
| 6-75670 | 3/1994 | (JP) . |
| 7-241047 | 9/1995 | (JP) . |
| 9-37477 | 2/1997 | (JP) . |

Primary Examiner—Edward H. Tso
(74) Attorney, Agent, or Firm—Frommer Lawrence & Haug, LLP.; William S. Frommer; Bruno Polito (57) ABSTRACT

Two battery packs are loaded into respective loading portions, and serve to deliver power to respective units of a personal computer through a port and are supplied with power through the port from an AC adapter connected to an AC power supply so that they are charged. Each lock portion serving as a loading mechanism includes a switch interlocking therewith. Output of the switch is delivered to a CPU serving as a mode control unit. The CPU controls a CPU serving as a switch control unit within the battery pack in correspondence with loading state of the battery pack inputted from the switch interlocking with the lock portion to switch operation mode of the battery pack. Thus, it is possible to prevent instantaneous cut-off of power supply at the time of removal of battery without allowing the apparatus to be complicated, and/or without allowing the cost to be high.

6 Claims, 7 Drawing Sheets

DEVICE AND METHOD FOR PROCESSING INFORMATION, BATTERY PACK, AND TRANSMITTING MEDIUM

TECHNICAL FIELD

This invention relates to an information processing apparatus and an information processing method adapted for preventing instantaneous cut-off of power supply by removal (detachment) of battery pack, and relates to a battery pack and a transmission medium adapted for recognizing in advance that battery pack is removed to prevent instantaneous cut-off of power supply.

1. Background Art

Figure 1:
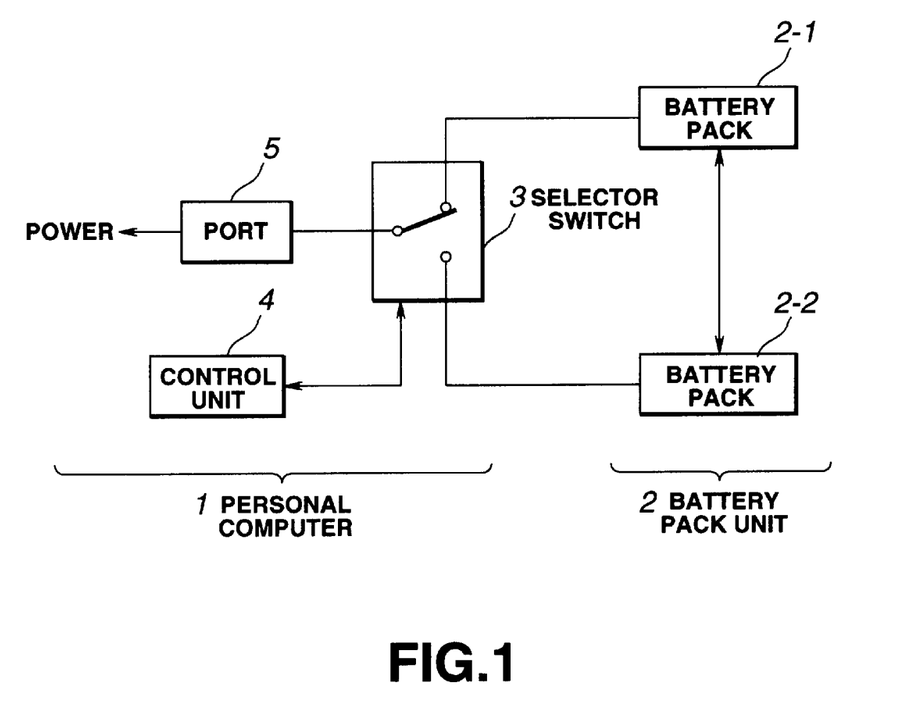
FIG. 1 is a block diagram showing conventional connection relationship between personal computer and battery packs.

FIG. 1 shows connection relationship between a personal computer 1 and a battery pack unit 2 for supplying power to the personal computer 1. As shown in this figure, battery packs 2-1 and 2-2 are detachably loaded (fitted) into the personal computer 1 through the battery pack unit 2.

A selector (changeover) switch 3 for carrying out switching between the battery pack 2-1 and the battery pack 2-2 is provided at the personal computer 1, and output of the battery pack 2-1 or the battery pack 2-2 is delivered into the personal computer 1 through a port 5 from the selector switch 3. Further, a control unit 4 for detecting insertion/removal of the battery pack 2-1 or 2-2 to control the selector switch 3 is provided at the personal computer 1. The selector switch 3 is required to be switched at high speed in order to prevent instantaneous cut-off of power (supply) with respect to unexpected insertion or removal of the battery pack 2-1 or 2-2. Accordingly, high speed characteristic is required also for the operation of the control unit 4.

Meanwhile, in order to realize speed required for the operation of the control unit 4, it is necessary to constitute the control unit 4 as hardware. In addition, it was necessary to provide dedicated communication line for transmitting signal of removal, etc. at high speed also between the battery pack 2-1 and the battery pack 2-2 so that when one battery pack is removed, power is supplied from the other battery pack. Accordingly, there were the problems that the conventional configuration of the battery pack unit 2 and the personal computer 1 becomes complicated and the cost becomes high.

2. Disclosure of the Invention

An object of this invention is to prevent instantaneous cut-off of supply of power without allowing the apparatus to be complicated and without allowing its cost to be high even when one of plural battery packs is removed.

To realize this, an information processing apparatus according to this invention is directed to an information processing apparatus in which plural battery packs are loaded (fitted) as power supply (source) so that they can be inserted or removed (detached), wherein there is provided mode control means for setting operation mode of the battery pack on the basis of detection result of detector (detecting) means for detecting the state where the battery pack is loaded (fitted).

In this case, the detector means interlocks with loading mechanism for loading (fitting) the battery pack, and serves to detect release state of the loading mechanism before the battery pack is completely removed (detached).

Moreover, the detector means may mechanically detect release state of the loading mechanism with respect to the battery pack or electoronically detect such release state.

Further, the battery pack comprises therewithin charge control switch means and discharge control switch means, whereby respective switch means are turned ON or OFF by control by the mode control means so that switching of the operation mode is carried out.

Further, the mode control means serves to allow the charge control switch means and the discharge control switch means to be both turned ON to thereby allow the battery pack to be in active mode, to allow only the discharge control switch means to be turned ON to thereby allow the battery pack to be in passive mode, and to allow the charge control switch means and the discharge control switch means to be both turned OFF to thereby allow the battery pack to be in shut mode.

Further, when the detector means detects release state of the loading mechanism with respect to any one battery pack which is not in the shut mode of the battery packs, the mode control means allows the plural battery packs to be all in the passive mode.

Further, the mode control means executes, after waiting for time when operation mode of removed battery pack is changed (switched) from the passive mode to the shut mode, mode change (alteration) of the battery pack or packs to be active after any one of the battery packs is removed (detached).

In addition, as another information processing apparatus, the detector means may be provided within the battery pack. In this case, when the detector means of any one battery pack operative in modes except for the shut mode of the plural battery packs detects release state of the loading mechanism, the mode control means requests (requires) all the battery packs so that their operation modes are changed into the passive mode.

In this instance, the mode control means executes, after waiting for time when operation mode of the removed battery pack is changed from the passive mode to the shut mode, mode change of battery pack or packs to be active after any one of the battery packs is removed (detached).

When the detector means of battery pack in the shut mode of the plural battery packs detects release state of the loading mechanism, the mode control means does not all the battery packs to carry out mode change.

An information processing method according to this invention is directed to an information processing method for an information processing apparatus in which plural battery packs are loaded (fitted) as power supply (source) so that they can be inserted or removed, the method comprising: a detection step of detecting the state where the battery pack is loaded; and a mode setting step of setting mode of the battery pack on the basis of the state detected at the detection step.

In this instance, at the detection step, a procedure is taken such that detection operation interlocks with operation of loading mechanism for loading (fitting) the battery pack to detect release state of the loading mechanism before the battery pack is completely removed.

A battery pack according to this invention is directed to a battery pack including a secondary battery therewithin and adapted for supplying power to an electronic equipment, the battery pack comprising: detector means for detecting loading with respect to the elecronic equipment; discharge control switch means for controlling discharge operation with respect to the electronic equipment; charge control switch means for controlling charge operation with respect to the secondary battery; and switching control means operative on the basis of detection result from the detector means, the switching control means being adapted to allow the charge control switch means and the discharge control switch means to be both turned ON to thereby allow the battery pack to be placed in active mode, to allow only the discharge control switch means to be turned ON to thereby allow the battery pack to be placed in passive mode, and to allow the charge control switch means and the discharge control switch means to be both turned OFF to thereby allow the battery pack to be placed in shut mode, whereby in the case where the detector means detects release state of the loading mechanism when the battery pack is in modes except for the shut mode, the switching control means allows the discharge control switch means to be turned ON to allow the battery pack to change to (shift) the passive mode.

In this case, in the case where the battery pack is in the shut mode, even when the detector means detects release state of the loading mechanism, the switching control carries out no operation.

A transmission medium according to this invention is directed to a transmission medium where computer program is caused to undergo transmission, wherein the computer program is used in an information processing apparatus in which plural battery packs are loaded as power supply (source) so that they can be inserted or removed (detached), the computer program comprising: a detection step of detecting the state where the battery pack is loaded with respect to the information processing apparatus; and a mode setting step of setting mode of the battery pack on the basis of the state detected at the detection step.

BEST MODE FOR CARRYING OUT THE INVENTION

Figure 2:
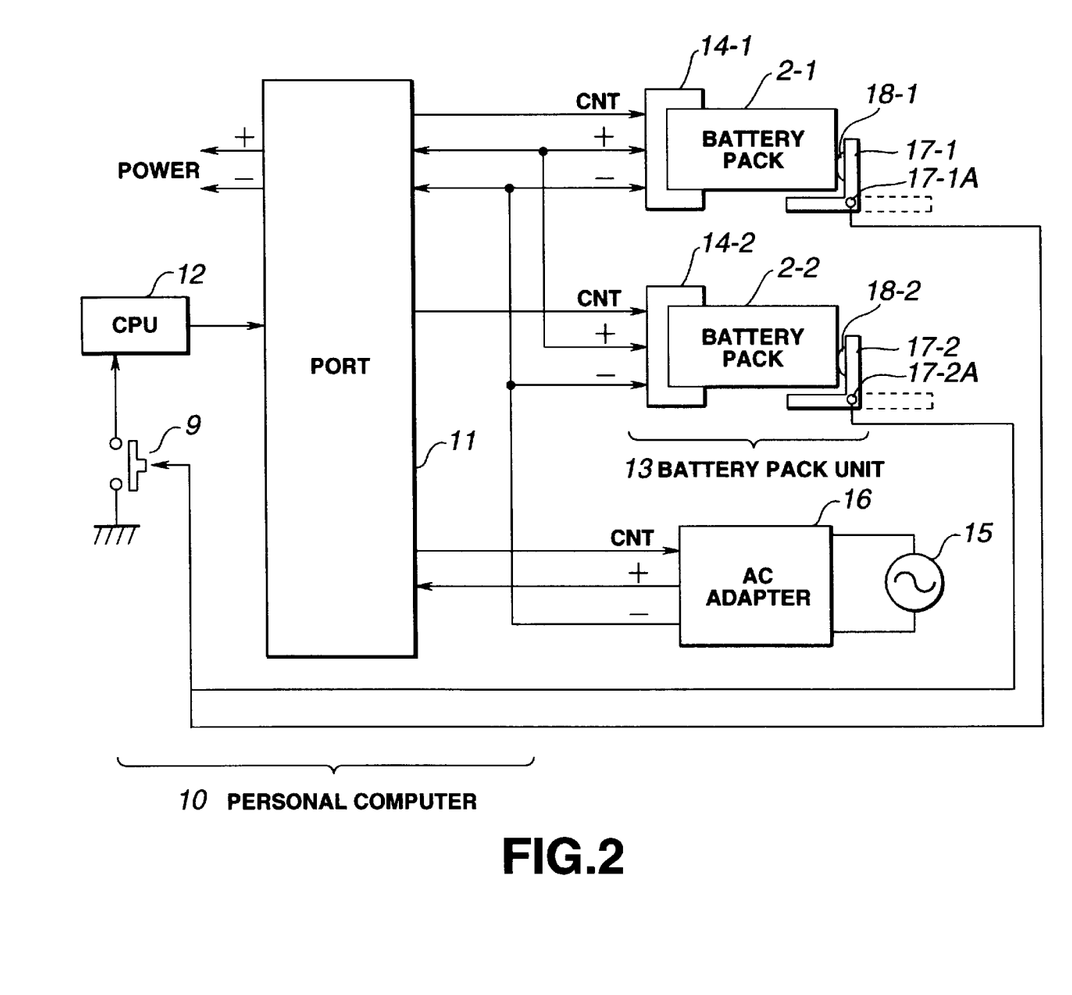
FIG. 2 is a block diagram showing the configuration of personal computer to which this invention is applied.

FIG. 2 is a block diagram showing a personal computer 10 supplied with power from battery packs 2-1, 2-2, which is the best mode for carrying out this invention. The two battery packs 2-1, 2-2 are respectively loaded into loading portions 14-1, 14-2 of a battery pack unit 13, and delivers power to respective units of the personal computer 10 through a port 11 and are supplied with power through the port 11 from an AC adapter 16 connected to an AC power supply 15 so that they are charged.

In the battery pack unit 13, when the battery packs 2-1, 2-2 are loaded into loading portions 14-1, 14-2, they are respectively locked by lock portions 17-1, 17-2. Namely, the lock portions 17-1, 17-2 serve as loading mechanisms for loading the battery packs 2-1, 2-2 into the loading portions 14-1, 14-2, respectively.

The lock portion 17-1 is adapted so that when the battery pack 2-1 is removed (detached) from the loading portion 14-1, that lock portion is rotated so that it is located at the position indicated by broken lines in the figure with a shaft 17-1A being as center, while when the battery pack 2-1 is loaded thereinto, that lock portion is rotated so that it is located at the position indicated by solid line in the figure.

Moreover, the lock portion 17-1 includes a switch 18-1 which is turned OFF when that lock portion is rotated so that it is located at the position of broken lines and is turned ON as the result of the fact that the switch is pressed by the battery pack 2-1 when that lock portion is rotated so that it is located at the position of solid line. Namely, the switch 18-1 interlocks with the lock portion 17-1 serving as the loading mechanism. It is to be noted that the switch 18-1 may be adapted so that when that lock portion is rotated so that it is located at the position of broken lines, that switch is turned ON, while when the lock portion is rotated so that it is located at the position of solid line, that switch is turned OFF. Output of the switch 18-1 is delivered to a CPU 12 serving as mode control unit through a switch 9.

Similarly to the lock portion 17-1, the lock portion 17-2 is adapted so that when the battery pack 2-2 is removed (unloaded) from the loading portion 14-2, that lock portion is rotated with a shaft 17-2A being as center so that it is located at the position indicated by broken lines in the figure to allow a switch 18-2 to be turned OFF. In addition, when the battery pack 2-2 is loaded, that lock portion is rotated so that it is located at the position indicated by solid line in the figure to allow the switch 18-2 to be turned ON. This switch may be adapted so that operations of ON and OFF are opposite to the above. Output of the switch 18-2 is also delivered to the CPU 12 through the switch 9.

The CPU 12 serving as the mode control unit controls CPUs 36-1, 36-2 shown in FIG. 3 serving as switch control units of the battery packs 2-1, 2-2 through the port 11 in correspondence with detection result relating to removal (unloading) or loading of the battery packs 2-1, 2-2 inputted through the switch 9 from the switches 18-1, 18-2 interlocking with the lock portions 17-1, 17-2 to switch the operation mode (which will be described later) of the battery packs 2-1, 2-2.

The port 11 is adapted to deliver power inputted from the battery packs 2-1, 2-2 or the AC adapter 16 to respective units of the personal computer 10, and to deliver power inputted from the AC adapter 16 to the battery packs 2-1, 2-2.

The AC adapter 16 is adapted to convert AC power from the AC power supply 15 into DC power to output it to the port 11.

The electric configuration of the battery packs 2-1, 2-2 will now be described with reference to FIG. 3.

The battery pack 2-1 includes a terminal 21-3 adapted so that control signal CNT is inputted or outputted in addition to a power supply terminal 21-1 of the +(plus) side and a power supply terminal 21-2 of the −(minus) side. At the personal computer 10 side, there are provided terminals 20-1 to 20-3 so that terminals 21-1 to 21-3 are connected when the battery pack 2-1 is loaded. The terminals 20-1 and 20-2 are respectively connected to terminals 11-1 and 11-2 of the port 11. In addition, the terminal 20-3 is connected to a terminal 11-5 of the port 11.

The battery pack 2-2 similarly includes terminals 21-4, 21-5 for power supply and a terminal 21-6 for control signal input/output. At the personal computer 10 side, there are respectively provided terminals 20-4 to 20-6 in correspondence with the terminals 21-4 to 21-6 of the battery pack 2-2 side.

The power supply terminal 20-4 and the terminal 20-1 of the personal computer 10 side are commonly connected, and the terminal 20-5 and the terminal 20-2 are commonly connected. The signal input/output terminal 20-6 is connected to a terminal 11-6 of the port 11.

The AC adapter 16 includes a terminal 21-7 adapted so that control signal is inputted or outputted in addition to a +(plus) side power supply terminal 21-8 and a −(minus) side power supply terminal 21-9. At the personal computer 10 side, there are provided terminals 20-7 to 20-9 so that terminals 21-7 to 21-9 are connected when the AC adapter 16 is loaded. As described above, the AC adapter 16 converts AC power from the AC power supply 15 into DC power to deliver it to the personal computer 10 or the battery packs 2-1, 2-2.

At the port 11, there are provided terminals 11-3, 11-4. Power delivered from the terminals 11-1, 11-2 is delivered to respective units of the personal computer 10 through these terminals 11-3, 11-4. Moreover, at the port 11, a terminal 11-9 is provided. The CPU 12 serving as the mode control unit is connected to the terminal 11-9. The CPU 12 can output a control signal to the port 11 through this terminal 11-9, and can deliver control signals from the terminals 11-5 to 11-7 to respective battery packs 2-1, 2-2 and the AC adapter 16 and can be supplied with signals in a manner opposite to the above.

The battery pack 2-1 includes a secondary battery 31-1 which is chargeable battery. Further, the +(plus) side terminal of the secondary battery 31-1 is connected to the terminal 21-1 through a series circuit of a Field Effect Transistor (FET) 32C-1 serving as switch for charge control and a FET 34D-1 serving as switch for discharge control. The FET 32C-1 and 34D-1 respectively include parasitic diodes 33-1 and 35-1. The −(minus) side terminal of the secondary battery 31-1 is connected to the terminal 21-2 through a resistor 37-1 for current detection.

The battery pack 2-1 comprises a CPU 36-1 for controlling switching operation of the FET 32C-1 and the FET 34D-1 which respectively serve as charge control and discharge control switches. The CPU 36-1 allows the FETs 32C-1, 34D-1 to be turned ON or OFF in correspondence with control signal delivered through the port 11 and terminal 21-3 from the CPU 12 to protect the secondary battery 31-1.

Moreover, this CPU 36-1 detects voltage of both ends of the terminals 21-1 and 21-2 and voltage of both ends of the secondary battery 31-1, and detects, from voltage of both ends of the resistor 37-1, current flowing in the secondary battery 31-1 (resistor 37-1). Further, the CPU 36-1 allows the FET 32C-1 or 34D-1 to be turned ON or OFF in correspondence with values of voltage of the both ends of the terminals 21-1, 21-2 and terminal voltage of the secondary battery 31-1 to protect the secondary battery 31-1.

The battery pack 2-2 is also constituted in a manner similar to the battery pack 2-1. Namely, the battery pack 2-2 includes a secondary battery 31-2 which is chargeable battery. Further, the +(plus) side terminal of the secondary battery 31-2 is connected to the terminal 21-4 through a series circuit of a FET 32C-2 and a FET 34D-2. The FETs 32C-2, 34D-2 respectively include parasitic diodes 33-2 and 35-2. The −(minus) side terminal of the secondary battery 31-2 is connected to the terminal 21-5 through a resistor 37-2.

The battery pack 2-2 comprises a CPU 36-2 for controlling switching operation of the FET 32C-2 and the FET 34D-2. The CPU 36-2 allows the FET 32C-2, 34D-2 to be turned ON or OFF in correspondence with control signal delivered through the port 11 and the terminal 21-6 from the CPU 12 to protect the secondary battery 31-2.

Moreover, this CPU 36-2 allows the FET 32C-2 or 34D-2 to be turned ON or OFF in correspondence with values of voltage of both ends of the terminal 21-4 and the terminal 21-5 and voltage of both ends of the secondary battery 31-2 to protect the secondary battery 31-2.

Figure 4A:
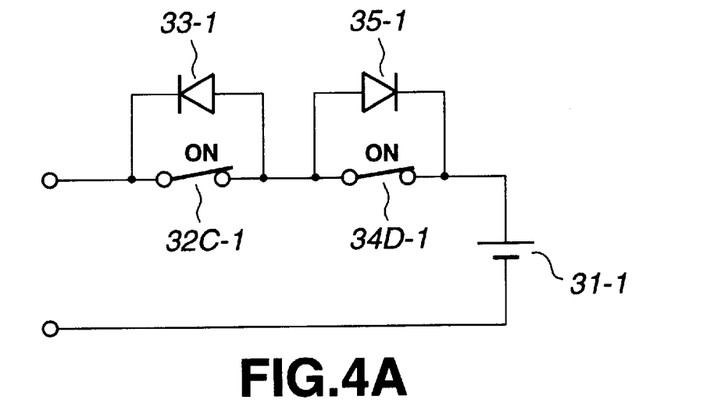
FIG. 4A is a view for explaining active mode of modes of the battery pack.
Figure 4B:
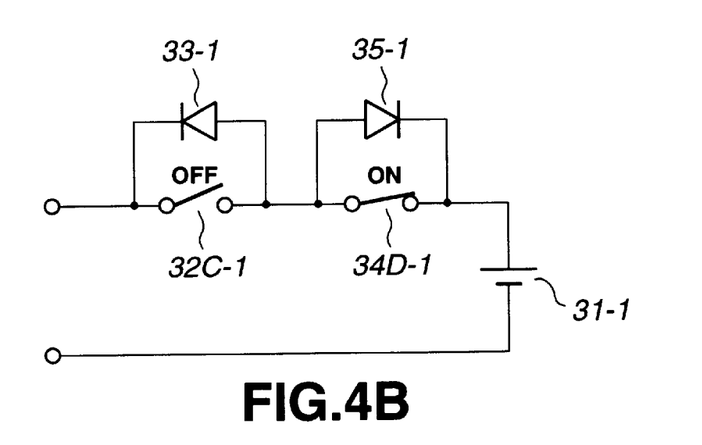
FIG. 4B is a view for explaining passive mode of the modes of the battery pack.
Figure 4C:
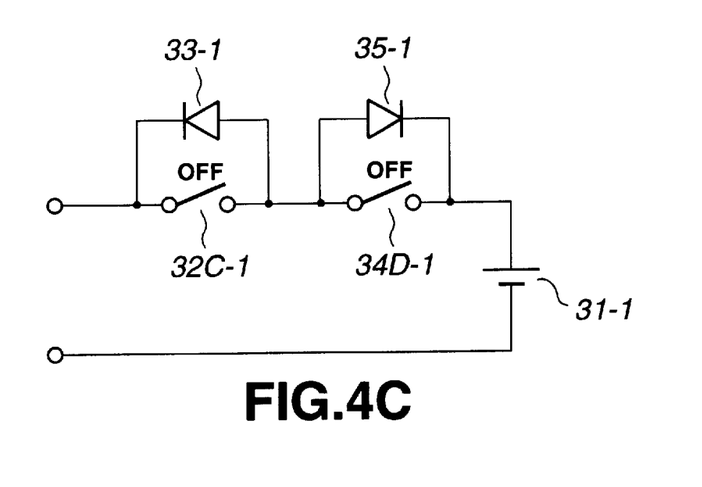
FIG. 4C is a view for explaining shut mode of the modes of the battery pack.

The battery packs 2-1, 2-2 are placed in three operation modes as indicated below. Explanation will be given with reference to FIGS. 4A, 4B and 4C in regard to the case where particularly only the battery pack 2-1 is taken as example with respect to these three operation modes. These operation modes are defined by the state of ON/OFF of the charge control switch FET 32C-1 and the discharge control switch 34D-1 which are included within the battery pack 2-1. In FIG. 4, respective FETs are indicated as switch in model form.

Active mode is shown in FIG. 4A. In this active mode, the discharge control switch 34D-1 and the charge control switch 32C-1 are caused to be both turned ON. Accordingly, in this active mode, the secondary battery 31-1 can carry out both discharge and charge operations.

Passive mode is shown in FIG. 4B. In this passive mode, the discharge control switch 34D-1 is caused to be turned ON and the charge control switch 32C-1 is caused to be turned OFF. Accordingly, in this passive mode, the secondary battery 31-1 can carry out only discharge operation.

Shut mode is shown in FIG. 4C. In this shut mode, both the discharge control switch 34D-1 and the charge control switch 32C-1 are caused to be turned OFF. Accordingly, in this shut mode, the secondary battery 31-1 cannot carry out both charge and discharge operations.

In the personal computer 10 in which the battery packs 2-1, 2-2 are connected through the battery pack unit 13, as a method of discharging the battery packs 2-1, 2-2, there exist two kinds of discharge operations of series discharge in which after discharge of one of the battery packs 2-1, 2-2 is completed, the other battery pack starts discharge operation and parallel discharge in which both the battery packs 2-1, 2-2 are discharged at the same time.

On the other hand, as a method of charging battery packs 2-1, 2-2, there exist two kinds of charge operations of series charge in which after charge of one of the battery packs 2-1, 2-2 is completed, the other battery pack starts charge operation and parallel charge in which both the battery packs 2-1, 2-2 are charged at the same time.

In the series discharge and the series charge, one of the battery packs 2-1, 2-2 is in active mode, and the other battery pack is in shut mode. In the parallel discharge and the parallel charge, both the battery packs 2-1, 2-2 are in active mode.

The merit in the series discharge is that one of battery packs 2-1, 2-2 can be selected in dependency upon circumstances to carry out discharge operation. The merit of the series charge is that the time required for charging only one of the battery packs 2-1, 2-2 is short as compared to the case in the parallel charge.

The merit in the parallel discharge is that discharge time, i.e., the time required for working the personal computer 10 is long as compared to the case of the series discharge. The merit of the parallel charge is that the time required for charging both the battery packs 2-1 and 2-2 is short as compared to the case of the series charge.

Moreover, the demerit in the series discharge is that discharge time is short as compared to the case of parallel discharge. The demerit of the series charge is that the time required for charging both the battery packs 2-1 and 2-2 is long as compared to the parallel charge.

The demerit in the parallel discharge is that discharge operations of both the battery packs 2-1 and 2-2 are completed at the same time. The demerit of the parallel charge is that the time required for charging one of the battery packs 2-1, 2-2 is long as compared to the case of the series charge.

Figure 3:
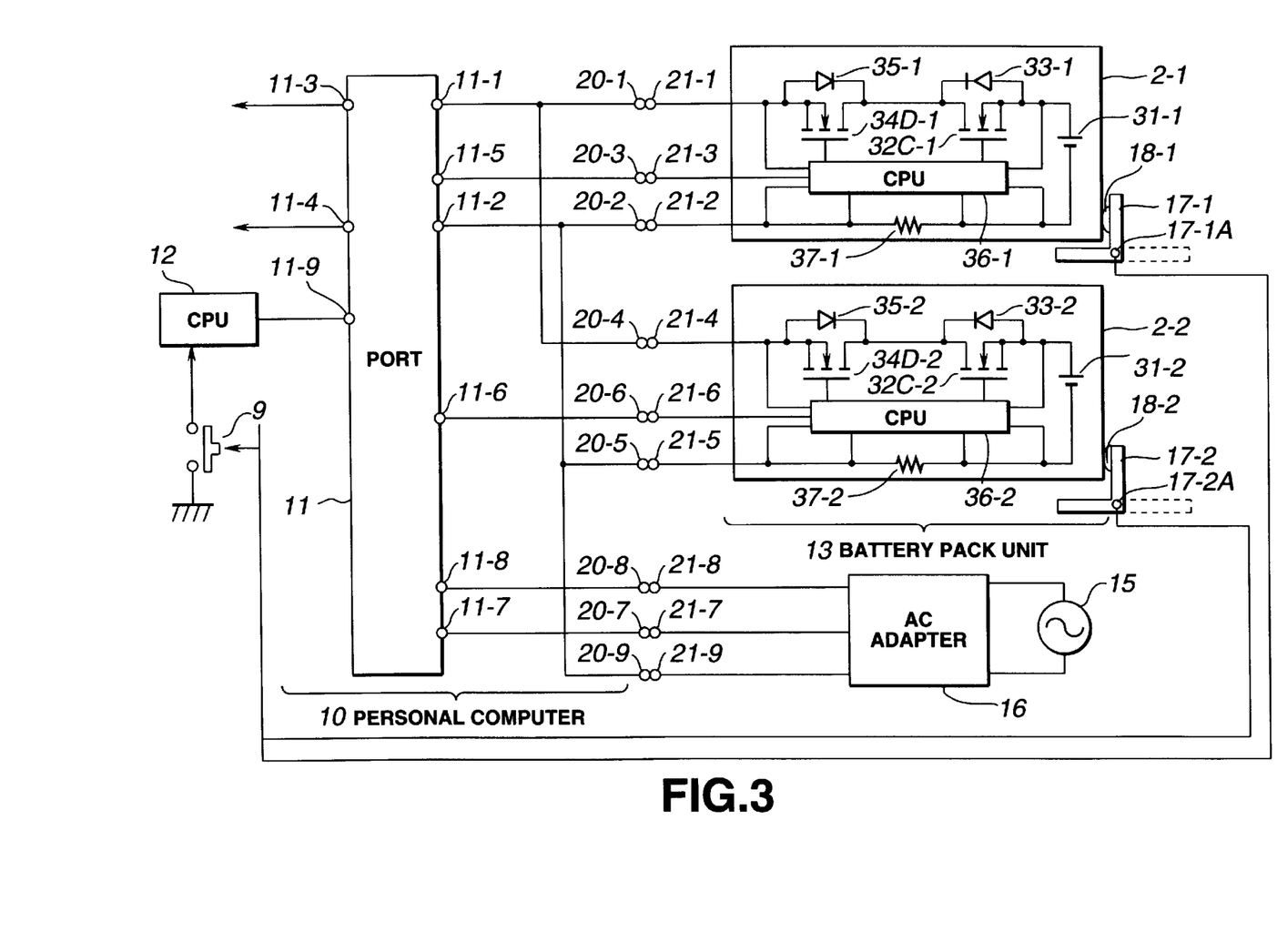
FIG. 3 is a view showing electric configuration of battery packs connected to the personal computer of FIG. 2.

In the personal computer 10 shown in FIGS. 2 and 3, in consideration of the merit and the demerit of the series discharge or charge and the parallel discharge or charge, user can arbitrarily select one of them. In more practical sense, it is possible to select series charge/discharge or parallel charge/discharge by picture on screen of the personal computer 10. In addition, it is possible to also select battery pack to be used by picture on screen.

Initially, the operation when user selects, through the picture on screen, series discharge in which the battery pack 2-1 is discharged thereafter to discharge the battery pack 2-2 will be described. The CPU 36-1 of the battery pack 2-1 allows both the discharge control FET 34D-1 and the charge control FET 32C-1 to be turned ON by control of the CPU 12 of the personal computer 10 to place the battery pack 2-1 in the active mode. On the other hand, the CPU 36-2 of the battery pack 2-2 sets, by control of the CPU 12, the operation mode of the discharge control FET 34D-1 and the charge control FET 32C-1 to the shut mode. Accordingly, the battery pack 2-1 carries out discharge operation and the battery pack 2-2 does not carry out discharge operation.

When discharge operation from the battery pack 2-1 is continued and terminal voltage of the battery 31-1 gradually lowers with passing of tie, the CPU 12 displays, at the picture on screen, its voltage lowering information obtained through the CPU 36-1. In the case of the manual operation, user confirms that picture on screen to switch discharge from the battery pack 2-1 to the battery pack 2-2. In addition, in the case of the automatic operation, the CPU 12 may allow the CPU 36-2 to carry out discharge from the battery pack 2-2.

Also in either case, the CPU 36-1 of the battery pack 2-1 allows both the discharge control FET 34D-1 and the charge control FET 32C-1 to be turned OFF by control of the CPU 12 to place the battery pack 2-1 in the shut mode. On the other hand, the CPU 36-2 of the battery pack 2-2 sets operation mode of the discharge control FET 34D-2 and the charge control FET 32C-2 to the active mode by control of the CPU 12. Accordingly, the battery pack 2-2 carries out discharge operation, but the battery pack 2-1 does not carry out discharge operation.

The operation when user selects, through the picture on screen, parallel discharge in which the battery pack 2-1 of lower battery voltage and the battery pack 2-2 of higher battery voltage are discharged in parallel will be described below.

The CPU 12 of the personal computer 10 requests the CPUs 36-1, 36-2 of the respective battery packs 2-1, 2-2 to carry out detection of battery voltages of the respective batteries 31-1, 31-2.

The CPU 36-1 detects voltage of the secondary battery 31-1 in correspondence with this request to notify its detection result to the CPU 12. Similarly, the CPU 36-2 detects voltage of the secondary battery 31-2 to notify its detection result to the CPU 12.

The CPU 12 receives notification from the two battery packs 2-1 and 2-2 in this way to detect that voltage of the secondary battery 31-2 of the battery pack 2-2 is higher than that of the secondary battery 31-1 of the battery pack 2-1.

Then, the CPU 12 requests the CPU 36-1 to set the passive mode in which the FET 32C-1 of the battery pack 2-1 of lower terminal voltage is turned OFF and the FET 34D-1 thereof is turned ON. Further, the CPU 12 requests the CPU 36-2 to set the active mode in which both the FET 32C-2 and the FET 34D-2 of the battery pack 2-2 of higher voltage are turned ON. The CPU 36-2 allows both the FET 32C-2 and the FET 34D-2 to be turned ON in correspondence with this request to start discharge.

When the FETs 34D-2, 32C-2 of the battery pack 2-2 are both turned ON, discharge current from the secondary battery 31-2 of the battery pack 2-2 is not interrupted (cut off) and charge current with respect to the secondary battery 31-2 is not interrupted.

The battery pack 2-2 supplies power from the secondary battery 31-2 to respective units of the personal computer 10 via the secondary battery 31-2, the FET 32C-2, the FET 34D-2, the terminals 21-4, 20-4, 11-1, 11-3, 11-4, 11-2, 20-5, 21-5 and the resistor 37-2.

Since the secondary battery 31-2 supplies power, its terminal voltage gradually lowers with passing of time. On the contrary, since the battery pack 2-1 does not carry out discharge operation, terminal voltage of the secondary battery 31-1 hardly lowers and remains to be constant voltage.

Meanwhile, voltage actually outputted from the battery pack 2-1 is lowered by voltage drop of the parasitic diode 33-1 with respect to terminal voltage of the secondary battery 31-1. Thus, when output voltage of the secondary battery 31-2 and voltage outputted from the battery pack 2-1 are substantially equal to each other, discharge current flows from the battery pack 2-1. The CPU 36-1 detects discharge current of this secondary battery 31-1 .

In this case, when discharge current flows in the state where the battery pack 2-1 is in the passive mode, discharge current is passed through the parasitic diode 33-1 because the charge control FET 32C-1 is in OFF state. In order to eliminate loss of power by resistance of this parasitic diode 33-1, the CPU 36-1 is operative so that when it is judged that its discharge current is a predetermined reference value or more, the CPU 36-1 allows the FET 32C-1 of the battery pack 2-1 to be turned ON, i.e., set the batter pack 2-1 so that it is placed in the active mode.

By the above-mentioned processing, the secondary battery 31-2 and the secondary battery 31-1 are connected in parallel and both carry out discharge operation. For this reason, discharge current of the secondary battery 31-2 is once greatly lowered and gradually rises thereafter. Moreover, discharge current of the secondary battery 31-1 once greatly rises and gradually lowers thereafter.

Further, when discharge currents of the secondary battery 31-1 and the secondary battery 31-2 are equal to each other, discharge current of that value is continued to flow thereafter. Terminal voltages of the secondary battery 31-1 and the secondary battery 31-2 are substantially constant, but gradually lower with passing of time.

In this case, the reason why when terminal voltages of the two batteries are equal to each other, the battery pack 2-1 is caused to be in the active mode is as follows. When the battery pack 2-1 is caused to be in active mode in the state where terminal voltages of the both batteries are different from each other, charge operation is carried out from the secondary battery 31-2 of higher terminal voltage to the secondary battery 31-1 of lower terminal voltage. In order to prevent such operation, the battery pack 2-1 is caused to be in the active mode.

Meanwhile, in the series discharge and the series charge, since only one battery pack of two battery packs is used, there are instances where user may remove (detach) unused battery pack. In addition, there are instances where user may erroneously remove the battery pack being used. Thus, instantaneous interruption (cut-off) of power supply would take place.

In view of the above, in the personal computer 10, both battery packs are caused to be in the passive mode before either battery is removed to prevent instantaneous cut-off of power supply. The operation of the personal computer 10 adapted for preventing instantaneous cut-off of power supply followed by unexpected removal (detachment) of the battery pack in the series discharge and the series charge will be described below.

Figure 5:
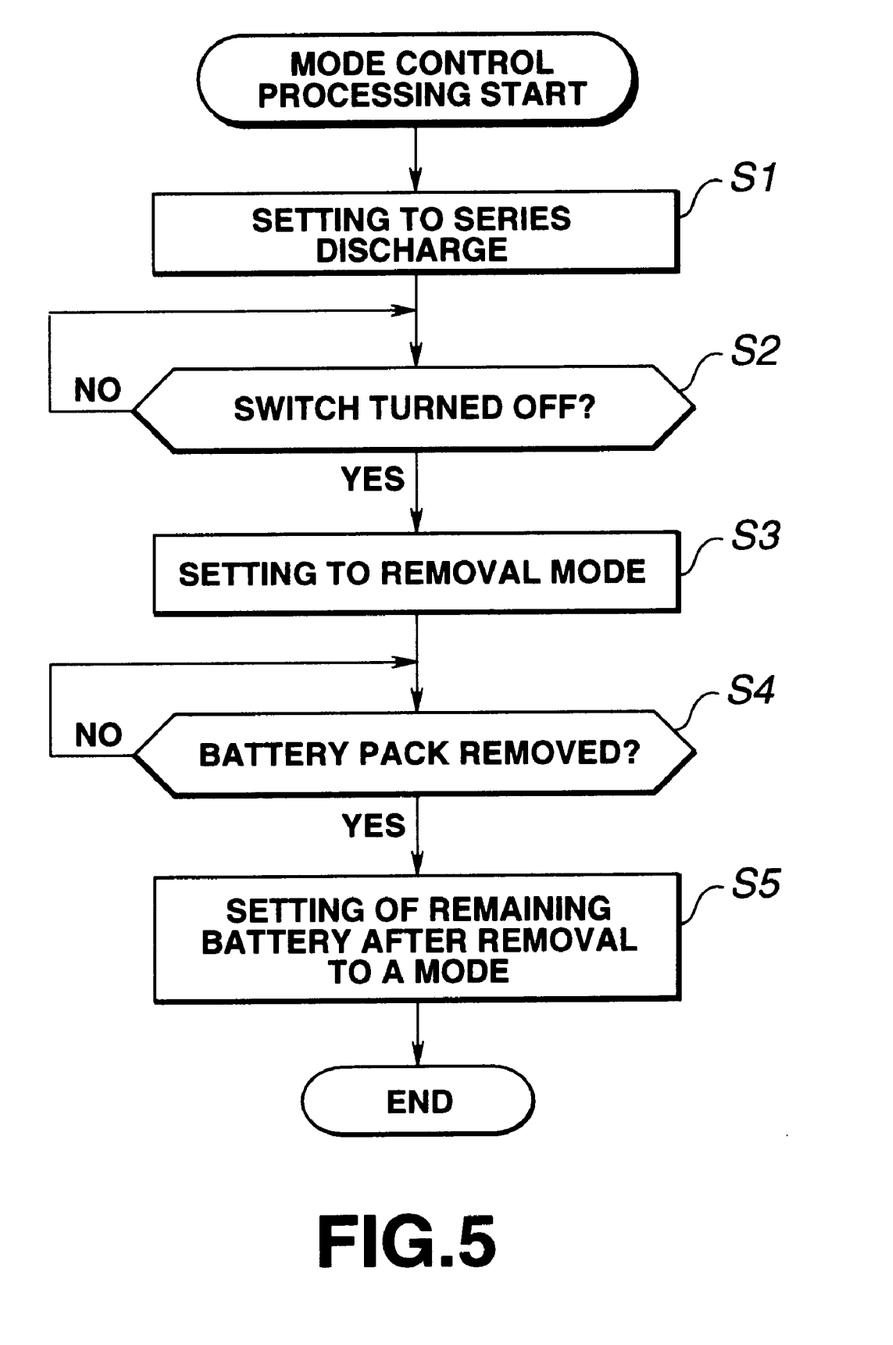
FIG. 5 is a flow chart for explaining mode control processing in the personal computer.

FIG. 5 shows a flow chart of mode control processing of the CPU 12 serving as the mode control unit in the case where the battery pack 2-1 is removed (detached) in the state of series discharge.

Initially, at step S1, the CPU 12 of the personal computer 10 sets the operation mode of the battery packs 2-1, 2-2 to the series discharge mode. In more practical sense, the CPU 36-1 of the battery pack 2-1 is caused to turn ON both the discharge control FET 34D-1 and the charge control FET 32C-1 to set the battery pack 2-1 so that it is placed in the active mode. On the other hand, the CPU 36-2 of the battery pack 2-2 is caused to turn OFF both the discharge control FET 34D-2 and the charge control FET 32C-2 to set the battery pack 2-2 so that it is placed in the shut mode. For this reason, the battery pack 2-1 carries out discharge operation and the battery pack 2-2 does not carry out discharge operation.

Then, the CPU 12 judges whether or not the switch 18-1 or 18-2 interlocking with lock portion 17-1 or 17-2 serving as the loading mechanism is turned OFF. When user attempts to remove (detach) the battery pack 2-1 being discharged, before the battery pack 2-1 loaded into the loading portion 14-1 is removed, the lock portion 17-1 serving as the loading mechanism is rotated so that it is located at the position indicated by broken lines in FIG. 2 with the shaft 17-1A being as center. At this time, the switch 18-1 interlocking therewith is turned OFF. That signal turns ON the switch 9. Thus, the CPU 12 is informed that any lock portion is unlocked (detached). Therefore, at step S2, the CPU 12 stands by (waits) until the switch 17-1 or 17-2 is turned OFF. When either switch is turned OFF, the processing operation proceeds to step S3.

At the step S3, the CPU 12 controls the CPU 36-1 to allow the charge control FET 32C-1 to be turned OFF to set the battery pack 2-1 so that it is placed in the passive mode. In addition, the CPU 12 controls the CPU 36-2 to allow the discharge control FET 34D-2 to be turned ON, and to allow the charge control FET 32C-2 to be turned OFF to set the battery pack 2-2 so that it is placed in the passive mode.

Accordingly, since both the battery packs 2-1 and 2-2 are placed in the state where their operation modes are set to the passive mode, any one of higher output voltage of the battery packs 2-1, 2-2 connected in parallel carries out discharge operation. Even if the battery pack 2-1 is removed (detached) in this state, since power is delivered from the battery pack 2-2, instantaneous cut-off of power supplied does not take place.

A certain short time is required until user actually removes the battery pack 2-1 from the loading portion 14-1 after lock state by the lock portion 17-1 is released. For this time period, both the battery packs 2-1 and 2-2 can be set so that they are placed in the passive mode. In this instance, the state where both battery packs 2-1, 2-2 are in the passive mode is caused (assumed) to be removal mode. When the battery packs 2-1, 2-2 are in the removal mode, even if any either one of them is removed, instantaneous cut-off of power supplied is substantially prevented.

Then, at step S4, the CPU 12 judges through the CPU of either battery pack whether or not the battery pack is removed. When the CPU 12 judges that the battery pack has been removed, the processing operation proceeds to step S5.

Then, at the step S5, the operation mode of the remaining battery pack after removal is set to the active mode (A mode). In this instance, it is necessary that time required for switching from the passive mode to the active mode of the remaining battery pack is longer than time required when the removed battery pack is switched from the passive mode to the shut mode.

In more practical sense, after the removed battery pack 2-1 is switched from the passive mode to the shut mode, the remaining battery pack 2-2 is caused to be in the active mode. The reason why such an approach is employed is to prevent erroneous operation as the result of the fact that the battery pack 2-1 once removed is loaded into the loading portion 14-1 in the state where it is yet in the passive mode.

The operation that removed battery pack is switched from the passive mode to the shut mode is carried out by the following processing. For example, the CPU 36-1 of the battery pack 2-1 recognizes that the battery pack 2-1 is removed by cut-off, etc. of communication line between the CPU 36-1 and the CPU 12 to allow the discharge control FET 34D-1 to be turned OFF. Thus, since the charge control FET 32C-1 is already turned OFF, shut mode can be set. In the shut mode, even when the battery pack is left in the state where the battery pack is removed (detached), no power is supplied to the power supply terminal. Accordingly, danger such as short circuit, etc. can be prevented. In addition, it can be prevented that large current erroneously flows in another battery pack when the battery pack is next inserted.

It is to be noted that while, in the personal computer 10 shown in FIGS. 2 and 3, the CPU 12 receives detection result from the switches 18-1 and 18-2 through the switch 9 to place two battery packs in the removal mode even if battery pack to be removed is particularly not known, the CPU 12 may directly judge, from detection result from the switch 18-1 or 18-2, the battery pack to be removed.

Figure 6:
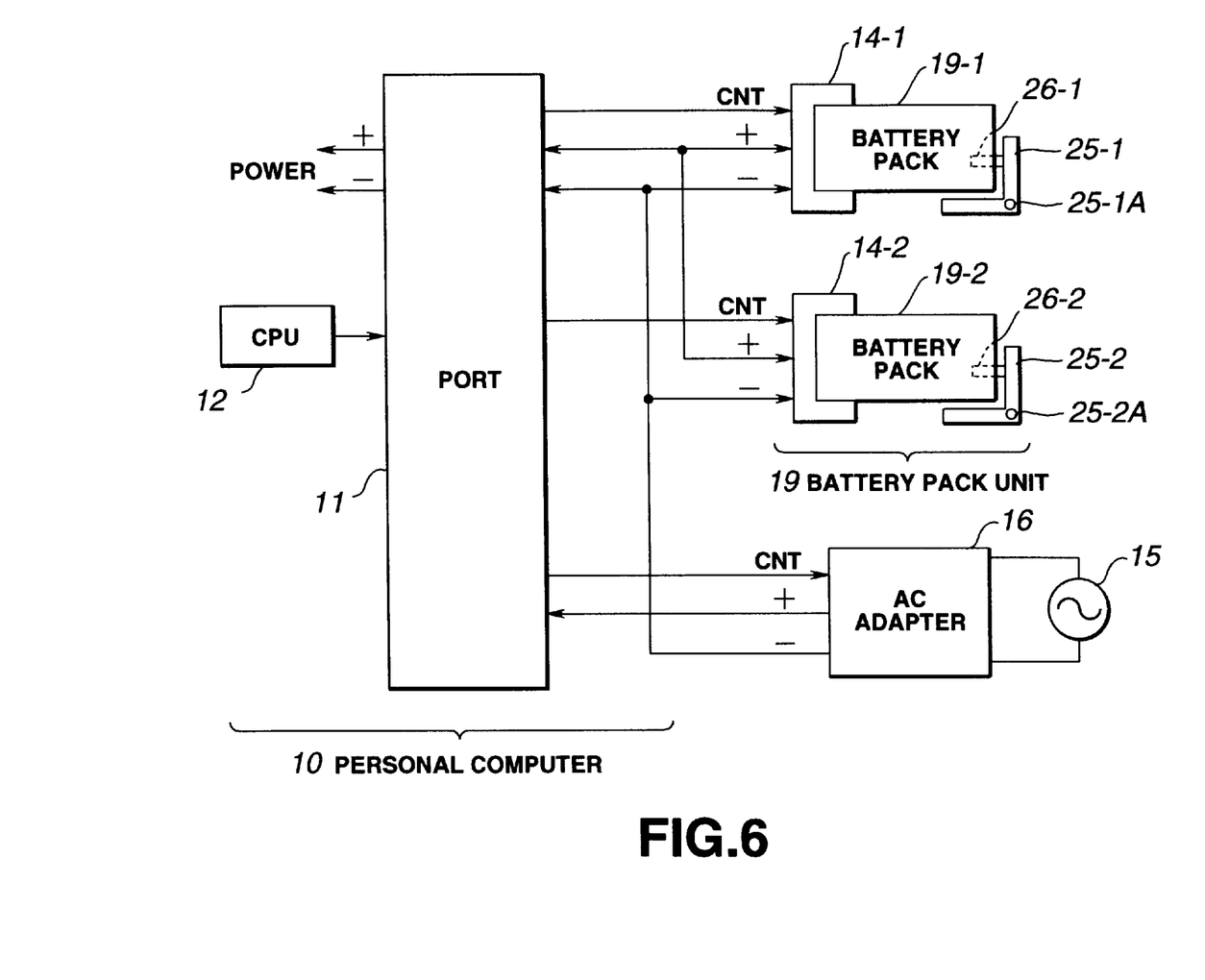
FIG. 6 is a block diagram showing another example of the configuration of personal computer and battery packs to which this invention is applied.

FIG. 6 is a block diagram showing personal computer 10 supplied with power from battery packs 19-1, 19-2, which is another best mode for carrying out this invention. Two battery packs 19-1, 19-2 are loaded into loading portions 14-1, 14-2 of a battery pack unit 19, and serve to deliver power to respective units of personal computer 10 through port 11 and is supplied with power through the port 11 from AC adapter 16 connected to AC power supply 15 so that they are charged.

In the battery pack unit 19, when the battery packs 19-1, 19-2 are loaded into the loading portions 14-1, 14-2, they are locked by lock portions 25-1, 25-2 serving as the loading mechanism.

The lock portion 25-1 is rotated with a shaft 25-1A being as center when the battery pack 19-1 is removed from the loading portion 14-1, and when the battery pack 19-1 is loaded thereinto.

Rotation of the lock portion 25-1, 25-2 can be detected by switches 26-1, 26-2 provided in a manner interlocking with the lock portions 25-1 and 25-2 within the battery packs 14-1, 14-2. Namely, in the battery packs 19-1 and 19-2, loading state into the loading portions 14-1, 14-2 can be detected by their own switches 26-1 and 26-2.

Outputs of the switches 26-1 and 26-2 of the battery packs 19-1 and 19-2 are delivered from the port 11 to the CPU 12 through CPUs 36-1 and 36-2 included therewithin.

Figure 7:
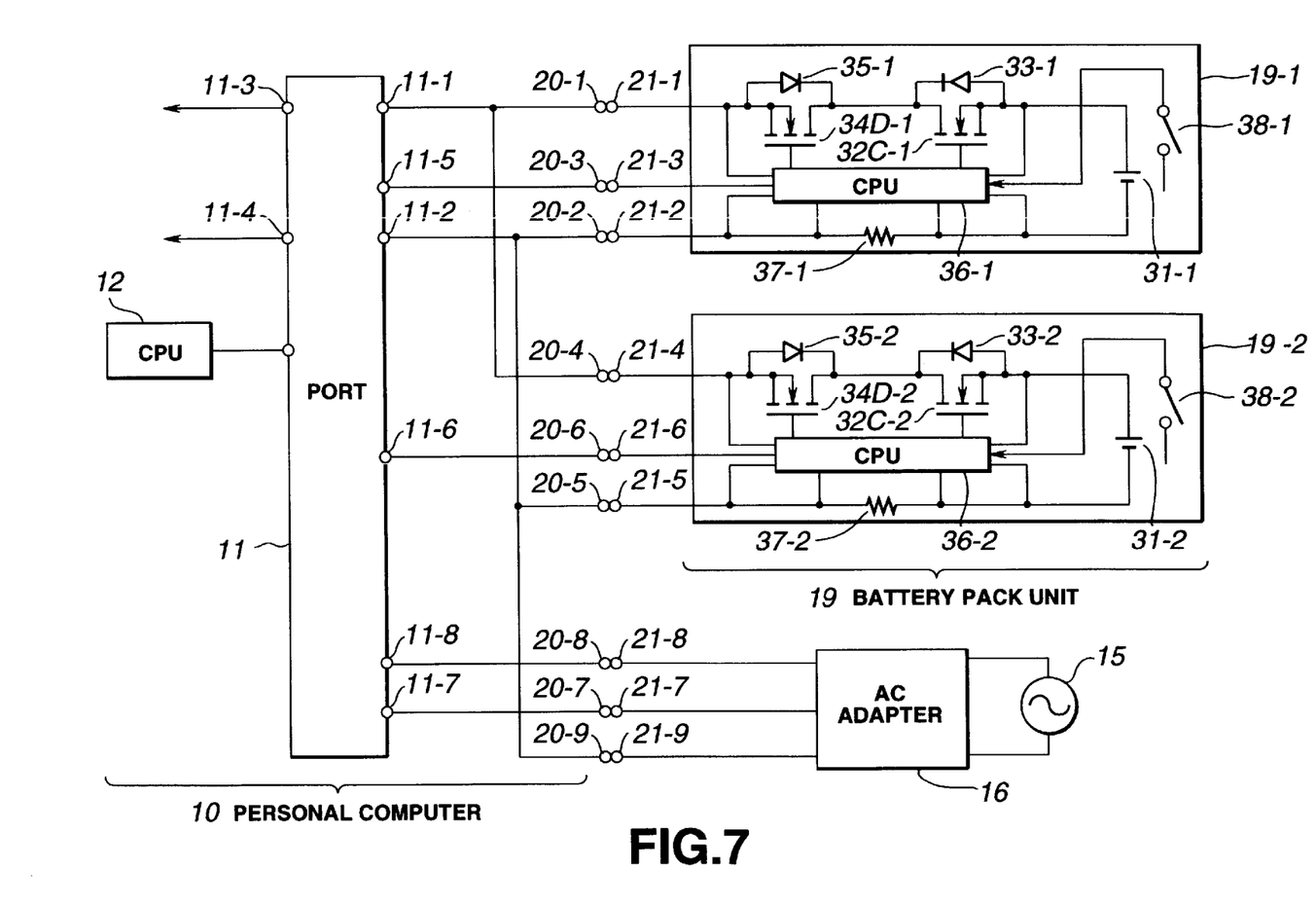
FIG. 7 is a view showing electric configuration of the battery packs shown in FIG. 6.

As shown in FIG. 7, an electric switch 38-1 corresponding to the switch 26-1 is provided within the battery pack 19-1. This electric switch 38-1 is connected to the CPU 36-1.

Moreover, an electric switch 38-2 corresponding to the switch 26-2 is provided within the battery pack 19-2. This electric switch 38-2 is connected to the CPU 36-2.

In the battery packs 19-1 and 19-2 including respective switches therewithin in order to recognize the loading state, switch 9 shown in FIGS. 2 and 3 at the personal computer 10 side becomes unnecessary. Namely, change at the personal computer 10 side becomes unnecessary. In addition, it is possible to inform to other battery pack through the CPU 12 that the (corresponding) battery pack is removed to inform change (shift) to the removal mode.

The operation in the case where when series discharge is carried out in the personal computer 10 shown in FIGS. 6 and 7, the battery pack 19-1 is unexpectedly removed will be briefly described.

The CPU 36-1 of the battery pack 19-1 recognizes, by switch 26-1, that the lock portion 25-1 is rotated in the opening direction so that loading is released (OFF of the switch 38-1 from an electric point of view). Thus, the CPU 36-1 transmits the fact to the CPU 12.

By control of the CPU 12, the CPU 36-1 allows the charge control FET 32C-1 to be turned OFF to set the battery pack 19-1 so that it is placed in the passive mode.

The CPU 36-2 of the battery pack 19-2 recognizes, through the CPU 12, that the battery pack 19-1 is removed to allow discharge control FET 34D-2 to be turned ON and to allow charge control FET 32C-2 to be turned OFF by control of the CPU 12 to set the battery pack 19-2 so that it is placed in the passive mode.

Accordingly, since both the battery packs 19-1, 19-2 are placed in the state where their operation modes are set to the passive mode, battery pack of higher output voltage of the battery packs 19-1, 19-2 connected in parallel carries out discharge operation. Even if the battery pack 19-1 is removed in this state, since power is delivered from the battery pack 19-2, instantaneous cut-off of power supplied does not take place.

In the more practical example shown in FIGS. 2 and 3, the operation for removing the battery pack 2-1 being discharged has been described. The operation for removing the battery pack 2-2 which is not being discharged is as follows.

When user attempts to remove the battery pack 2-2, before the battery pack 2-2 loaded into the loading portion 14-2 is removed, the lock portion 17-2 is rotated with shaft 17-2A being as center so that it is located at the position indicated by broken lines. At this time, the switch 18-2 is turned OFF. That signal allows the switch 9 to be turned ON. Thus, the CPU 12 is informed that either one of lock portions is detached.

The CPU 12 allows the battery packs 2-1 and 2-2 to be both in the passive mode, i.e., the removal mode through the CPUs 36-1 and 36-2 of the battery packs 2-1 and 2-2.

Accordingly, since both the battery packs 2-1 and 2-2 are placed in the state where their operation modes are set to the passive mode, battery pack of higher output voltage of the battery packs 2-1, 2-2 connected in parallel carries out discharge operation. Even when the battery pack 2-2 is removed (detached) in this state, since power is supplied from the battery pack 2-1, instantaneous cut-off of power supplied does not take place.

In the personal computer 10 shown in FIGS. 6 and 7, it is possible to discriminate, by the CPU 12, which battery pack is removed by user. Accordingly, when battery pack which is not being discharged is removed, there is no necessity to intentionally set the operation mode to the removal mode.

Moreover, while switches 18-1, 18-2 or switches 26-1, 26-2 have been described as mechanical switch, e.g., electronic switch, e.g., photo diode or non-contact switch, etc. may be employed.

Further, as the detector means, there may be employed detector means capable of detecting contact of finger with respect to the battery pack, e.g., by change of electrostatic capacitance, etc.

Further, while, as the loading mechanism of the battery pack, lock system has been taken as example, there may be employed structure such that switch for detecting removal is operative at the initial or early time point of the removal operation so that switching to the removal mode is completed by the time when battery pack is actually removed like cover (door) member, or notch back, etc. Further, if push button is caused to be of configuration interlocking with the loading mechanism, forgetting of pushing down of the switch, etc. can be also prevented.

Further, while the number of battery packs is 2 (two) in the above-mentioned embodiments, if the number of battery packs is two or more, an arbitrary number of battery packs may be employed. In addition, electronic equipment into which the battery pack is loaded may be electronic equipments except for personal computer.

It is to be noted that computer program for carrying out the respective processing may be caused to undergo transmission to user through network transmission medium such as Internet or digital satellite, etc. in addition to transmission medium consisting of information recording (storage) medium such as magnetic disc or CD-ROM, etc.

As stated above, in accordance with this invention, such an approach is employed to detect loading state of the battery to set mode of the battery on the basis of its result. Accordingly, occurrence of instantaneous cut-off of power at the time of removal of battery can be prevented without allowing the apparatus to be complicated or allowing its cost to be high.

What is claimed is:

1. An information processing apparatus in which plural battery packs are loaded as power supply so that they can be inserted or removed, each battery pack having charge control switch means and discharge control switch means, the apparatus comprising:
mode control means for setting operation mode of each battery pack on the basis of a detection result of a detector means for detecting the state where the battery pack is loaded, the control means setting an active mode by turning ON the charge control switch means and turning ON said discharge control switch means, setting a passive mode by turning OFF the charge control switch means and turning ON said discharge control switch means, and setting a shut mode by turning OFF the charge control switch means and turning OFF said discharge control switch means; and the detector means interlocking with a loading mechanism for loading the battery pack and detecting a release state of the loading mechanism before the battery pack is completely removed.

2. An information processing apparatus as set forth in claim 1,
wherein when the detector means detects the release state of the loading mechanism with respect to any one battery pack which is not in the shut mode, the mode control means switches all of the battery packs to the passive mode.

3. An information processing apparatus as set forth in claim 2,
wherein when a battery pack is removed the mode control means waits for the operation mode of the removed battery pack to be switched from the passive mode to the shut mode and then switches one or more of the remaining battery pack(s) to the active mode.

4. An information processing method for an information processing apparatus in which plural battery packs are loaded as power supply so that they can be inserted or removed,
the method comprising the steps of:
detecting whether or not a battery pack is loaded, wherein an unloaded state is detected upon removal of the battery pack by detecting a release state of the battery pack's loading mechanism before the battery pack is removed; and
setting a mode of the battery pack on the basis of the state detected at the detection step.

5. A battery pack including a secondary battery therewithin and adapted for supplying power to an electronic equipment,
the battery pack comprising:
detector means for detecting loading with respect to the electronic equipment;
discharge control switch means for controlling discharge operation with respect to the electronic equipment;
charge control switch means for controlling charge operation with respect to the secondary battery; and
switching control means operative on the basis of detection result from the detector means, the switching control means being adapted to allow the charge control switch means and the discharge control means to be both turned ON to thereby allow the battery pack to be placed in active mode, to allow only the discharge control switch means to be turned ON to thereby allow the battery pack to be placed in passive mode, and to allow the charge control switch means and the discharge control switch means to be both turned OFF to thereby allow the battery pack to be placed in shut mode,
whereby in the case where the detector means detects release state of the loading mechanism when the battery pack is in modes except for the shut mode, the switching control means allows the discharge control switch means to be turned ON to change (shift) to the passive mode.

6. A battery pack as set forth in claim 5,
wherein in the case where the battery pack is in the shut mode, even when the detector means detects release state of the loading mechanism, the switching control means carries out no operation.

* * * * *